J. NITZSCHE.
WHEEL FENDER.
APPLICATION FILED JUNE 26, 1911.

1,013,804.

Patented Jan. 2, 1912.

Inventor
Julius Nitzsche

Witnesses
J. Milton Jester.
B. J. Muhlman

By C. L. Parker.
Attorney

UNITED STATES PATENT OFFICE.

JULIUS NITZSCHE, OF WISNER, NEBRASKA.

WHEEL-FENDER.

1,013,804. Specification of Letters Patent. Patented Jan. 2, 1912.

Application filed June 26, 1911. Serial No. 635,337.

*To all whom it may concern:*

Be it known that I, JULIUS NITZSCHE, a citizen of the United States, residing at Wisner, in the county of Cuming and State of Nebraska, have invented certain new and useful Improvements in Wheel-Fenders, of which the following is a specification.

This invention relates to a fender or protector for use in connection with the rear wheel of a sulky or gang plow, to prevent the wheel from being clogged with weeds, dirt, grass and the like.

An important object of this invention is to provide a wheel-fender of the above character, which is simple in construction, cheap to manufacture, positive in operation, and easy to be attached to and removed from the wheel.

Other objects and advantages of this invention will be apparent during the course of the following description.

Figure 1:
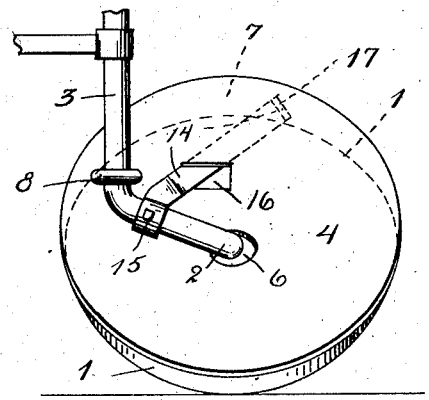
Figure 2:
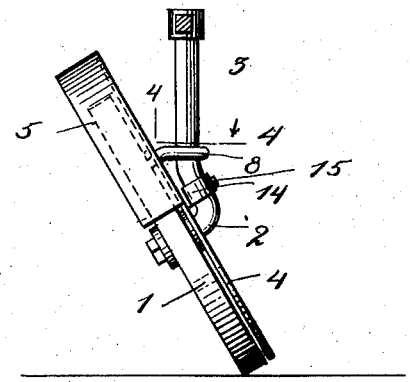
Figure 3:
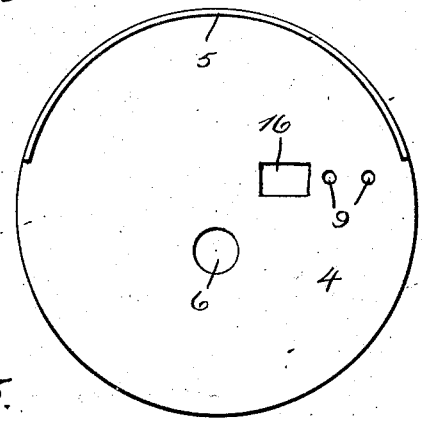
Figure 4:
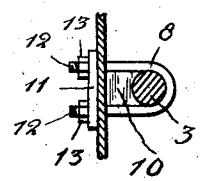

In the accompanying drawings forming a part of this specification and in which like numerals are employed to designate like parts throughout the same, Figure 1 is a side view of my improved fender, showing the same disposed in coöperative relation with the rear wheel of a sulky or gang plow, Fig. 2 is an end view of the same, Fig. 3 is an inner side view of my improved fender, the same being removed from the wheel, and Fig. 4 is a detail of means for attaching the fender to the axle of the wheel, the same being a section taken on line 4—4 of Fig. 2.

In the drawings wherein is illustrated a preferred embodiment of my invention, the numeral 1 designates a rear wheel of a sulky or gang plow, which is rotatably mounted upon the inclined lower end 2 of axle 3. Suitable means (not shown) are provided for turning the shaft 3 to steer the wheel 1 when the plow is being turned from its straight line of travel. The wheel 1 is inclined with relation to the ground, as shown in Figs. 1 and 2, as is customary in sulky and gang plows.

My improved fender comprises a circular disk 4, preferably provided upon its upper edge with a laterally extending approximately semi-circular flange 5, which is adapted to cover the upper portion of the wheel 1, as clearly shown in Fig. 2. The disk 4 is provided eccentrically thereof with an opening 6, through which extends the lower portion 2 of the axle 3. By thus positioning the opening 6 eccentrically, the lower edge of the disk 4 substantially coincides with that of the wheel 1 while a space 7 is provided between the flange 5 and the wheel 1.

The disk 4 is held in its requisite position by detachable clamping means, comprising a U-bolt 8, surrounding the lower portion of the axle 3 and passing through openings 9 formed through the disk 4. A block 10 is disposed between the axle 3 and the disk 4 and the U-bolt 8 passes through openings formed in a second block 11 and is provided beyond the same with screw-threaded ends 12 to receive nuts 13.

From the description of the above referred to parts, it is obvious that the disk 4 is rigidly connected with the axle 3.

The numeral 14 designates a scraper which is clamped to the lower portion of the axle 3 by a bolt 15 or the like and extends through an opening 16 of the disk 4 toward the upper portion of the wheel 1. The scraper 14 carries at its upper free end a lateral extension 17 to slidably engage the upper portion of the periphery of the wheel 1 and remove all material adhering to the periphery.

In use, my fender prevents material from being attached to the spokes and hub of the wheel and hence prevents the wheel from being clogged. The disk 4 is disposed very near the wheel 1, whereby practically no material will pass between the same. The fender is rigidly connected with the axle 3 and may be readily removed therefrom when desired. The scraper 14 fulfils the ordinary function of removing material from the periphery of the wheel.

A particular advantage of my invention is that the wheel fender can be readily attached to different makes of sulky and gang plows by a very slight change in the fastening means without any material alteration of the wheel fender or the plow.

I wish it understood that the form of my invention herewith shown and described is to be taken as a preferred example of the same, and that certain changes in the shape, size and arrangement of parts may be resorted to without departing from the spirit of the invention or the scope of the subjoined claim.

Having thus described my invention, I claim:—

The combination with an axle, a wheel rotatably mounted thereon, a fender comprising a circular disk disposed adjacent one side of the wheel and having an opening formed eccentrically therethrough for receiving the axle, said disk being provided upon its upper portion with a laterally extending flange spanning the upper portion of the periphery of the wheel, said disk having the lower portion of its periphery coinciding with the lower portion of the periphery of the wheel and the upper portion of its periphery extending beyond the upper portion of the periphery of said wheel to form a space between the wheel and the laterally extending flange, means for rigidly connecting the disk with the axle, and a scraper attached to the axle and extending through an opening in the disk to be positioned adjacent the periphery of the wheel within the space formed between said flange and the wheel.

In testimony whereof I affix my signature in presence of two witnesses.

JULIUS NITZSCHE.

Witnesses:
H. D. DEILY,
HUGO A. LEISY.